United States Patent Office 3,733,266
Patented May 15, 1973

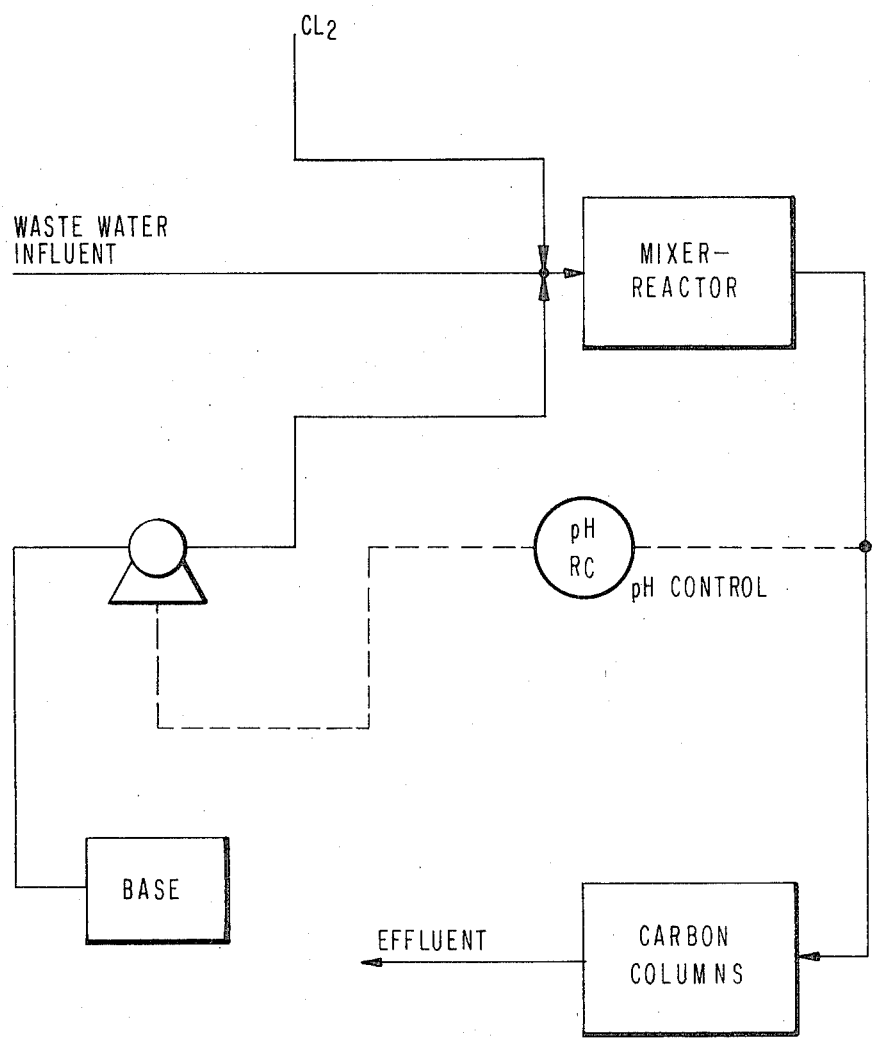

3,733,266
WASTE WATER PURIFICATION BY BREAKPOINT CHLORINATION AND CARBON ADSORPTION
Dolloff F. Bishop, Camp Springs, Md., and Alan F. Cassel and Thomas A. Pressley, Springfield, Va., assignors to the United States of America as represented by the Administrator of the Environmental Protection Agency
Filed Sept. 7, 1971, Ser. No. 178,310
Int. Cl. C02b 1/36; C02c 5/02
U.S. Cl. 210—26       7 Claims

ABSTRACT OF THE DISCLOSURE

Sodium hypochlorite or chlorine is used to oxidize the ammonia in raw, secondary and lime clarified municipal wastewaters using breakpoint chlorination. Carbon adsorption columns are located downstream from the breakpoint chlorinator. In wastewater, the breakpoint requires a minimum chlorine dose of approximately an 8:1 weight ratio of Cl:$NH_3$—N in lime clarified secondary effluent. A slight chlorine excess is used which is adsorbed by the carbon thereby inhibiting slime buildup.

FIELD OF INVENTION

The present invention relates to the purification of wastewaters by the use of breakpoint chlorination and carbon adsorption, and, more particularly, to an operation involving the control of the breakpoint chlorination reaction for removing ammonia from waste waters followed by carbon adsorption.

BACKGROUND OF THE INVENTION

Breakpoint chlorination, as practiced for many years in the water treatment industry, provides a physical-chemical means for removing ammonia from wastewaters. This procedure has been widely studied at $NH_3$—N concentrations usually below 1 mg/1; in such dilute waters, chlorine reacts with the ammonia to form various chloramines (1)    $Cl_2 + H_2O \rightarrow HOCl + HCl$ (2)    $NH_4^+ + HOCl \rightarrow NH_2Cl + H_2O + H^+$ (3)    $NH_2Cl + HOCl \rightarrow NHCl_2 + H_2O$ (4)    $NHCl_2 + HOCl \rightarrow NCl_3 + H_2O$ Chlorine is added to process waters until a point is reached where the total dissolved residual chlorine has reached a minimum (the breakpoint) and the $NH_3$—N has disappeared.

In water at $NH_3$—N concentrations of less than 1 mg./l., and before the breakpoint, the type of chloramine formed depends upon the pH. Spectrophotometric analyses had indicated that the chief constituent is monochloramine in the pH range of 7–8.5. As the pH decreases below 7, increasing amounts of dichloramine appear. In the pH range of 4.5–5.0, dichloramine is the chief product; below pH 4, nitrogen trichloride is the chief product.

Breakpoint chlorination studies on buffered synthetic ammonia samples at pH 7.0 had revealed that monochloramine concentration reaches a maximum at the 5:1 weight ratio of Cl:$NH_3$—N. As the weight ratio of Cl:$NH_3$—N exceeds 5:1, the monochloramine breaks down to form dichloramine and ammonia (Equation 5).

(5)    $2NH_2Cl \rightarrow NHCl_2 + NH_3$

The dichloramine reaches a maximum concentration at the Cl:$NH_3$—N weight ratio of about 7.5:1.

The prior art had also indicated that in water with less than 1 mg./l. of $NH_3$—N, the reaction proceeds in competition with monochloramine formation (Equation 2) until the chlorine dosage reaches the breakpoint at between the 9:1 and 10:1 weight ratio of Cl:$NH_3$—N. Other studies, however, had indicated that monochloramine is oxidized by excess chlorine under slightly alkaline conditions to nitrogen gas (Equation 6).

(6)    $2NH_2Cl + HOCl \rightarrow N_2 + 3HCl + H_2O$

Stoichiometrically, the ammonia oxidation through monochloramine to $N_2$ corresponds to a 7.6:1 weight ratio of Cl:$NH_3$—N. The prior art had also suggested the occurrence of other end-products, including nitrate and nitrogen trichloride. In fact, the nitrogen trichloride produced (Equation 4) in water treatment plants during breakpoint chlorination has been indicated to be a serious problem.

In wastewaters, the $NH_3$—N concentration may be more than an order of magnitude higher than those normally encountered in natural waters. Thus, in wastewater treatment, where ammonia concentrations usually lie between 15 and 20 mg./l., the most of large quantities of chlorine needed to reach breakpoint has generally inhibited serious consideration of the process. However, the major problem which has in the past inhibited the commercial utilization of breakpoint chlorination in wastewater has been the production of $NCl_3$; regardless of the quantity of chlorine feed, it has not previously been possible to prevent $NCl_3$ formation so that the desired breakpoint is not obtained and there results the additional production of highly dangerous poisonous substance in $NCl_3$.

Consequently, the art has moved to three other methods of ammonia removal from wastewaters. These are air stripping; selective ion exchange; and nitrification-denitrification. All of these methods suffer from the basic disadvantage of undesirably high cost. In air stripping, heated air is necessary in winter because ammonia volatility decreases sharply with decreasing temperature, and the cost of heating such air is prohibitively expensive. In addition, there are expensive periodic requirements caused by cold weather freezing of the tower, calcium carbonate scaling of tower packing, and decreased stripping efficiency with decreased ambient temperatures for a selected air:liquid ratio.

Besides high cost of operation, the use of selective ion exchange provides a difficulty in ultimate disposal, the ion exchange merely concentrating the ammonia in the regenerant solution; thus, the regenerant must be further treated such as by air stripping, stream stripping or breakpoint chlorination, each with its hitherto inherent disadvantages. The major disadvantages of nitrification-denitrification are operation costs, large capital costs with the necessary large land requirements, and the sensitivity of the biological organisms to process upset.

One of the widely studied methods for soluble organic carbon removal from wastewater has been adsorption on granular activated carbon beds. Total organic carbon removals generally average about 70%, however, several factors provide difficulty in process operation. With high concentrations of biodegradable organics, especially from clarified raw wastewaters adsorbed on the carbon, bacteria multiply and produce biological slime. The pores of the carbon granules are blinded by the slimes, thus reducing their physical adsorption capacity. Excessive pressure losses caused by the slimes require frequent backwashing of the lead carbon bed. The slimes adhering to the carbon cause channeling to develop through the carbon beds. Backwashing and surface washing does not completely eliminate the channels and washes out balls of carbon bound together by slime. The carbon is difficult to separate from the slime for recycle to the bed. Thus, high carbon loss may limit the process practicality.

The biological activity on the bed under anaerobic conditions also converts the sulfates in the water to noxious hydrogen sulfide. This H₂S is discharge with the process effluent and requires added control. While oxygen has been added to prevent anaerobic activity, its use stimulates heavy biological activity on adsorption systems receiving clarified raw wastewater thus further accelerating excessive pressure losses across the bed.

SUMMARY

It is, accordingly, an object of the invention to overcome the defects of the prior art, such as indicated above.

It is another object to optimize the breakpoint chlorination reaction in conjunction with subsequent carbon adsorption, in the face of varying quantities and flows of wastewaters, and varying concentrations of ammonia in such wastewaters.

It is yet another object to provide an improved method for the purification of wastewaters.

It is another object of the present invention to reduce slime buildup in carbon adsorption of wastewater impurities.

These and other objects and the nature and advantages of the instant invention are accomplished by careful control during the breakpoint chlorination reaction of pH and chlorine dosage to provide optimum breakpoint chlorination followed by feed of the resultant ammonia free effluent, containing a small amount of residual chlorine, to a carbon adsorption zone. There is provided the intentional combination of the two processes, breakpoint chlorination and carbon adsoption for maximum nitrogen and carbon removal. The byproducts of chloronation and the residual free chlorine are removed by the carbon bed, which the excess chlorine improves the performance of carbon adsorption.

The combination, in accordance with the present invention, of controlled breakpoint chlorination and carbon adsorption for wastewater treatment has the following advantages.

(1) The carbon columns remove nitrate and chloramines (byproducts of chlorination) from the wastewater.

(2) Biological activity and slim growth on the carbon is severely reduced by the free chlorine residual and the absence of ammonia after breakpoint. The minimizing of the slimes:

(a) inhibits the formation of hydrogen sulfide.
(b) allows the carbon to act as a physical adsorber.
(c) reduces carbon loss during backwashing and minimizes the frequency of backwashing.
(d) improves the performance of carbon adsorption.

(3) The combination provides a highly reliable method for nitrogen and carbon removal.

For a better understanding of the invention, a possible embodiment thereof will now be described, in part with reference to the attached drawing, it being understood that the embodiments so described are illustrative and exemplary, and in no way limitative.

BRIEF DESCRIPTION OF THE DRAWING

The figure is a flow diagram showing an embodiment of the present invention.

DETAILED DESCRIPTION

For use of breakpoint chlorination for effective and economical nitrogen removal at the $NH_3$—N concentrations encountered in wastewaters, the major products of the breakpoint reaction in wastewaters have been identified and the formation and behavior of the nuisance residuals of $NCl_3$ and $NO^-_3$ as a function of pH, chlorine dosage, and temperature have been determined.

Ammonia removal by breakpoint chlorination proceeds according to the overall reaction:

(7) $3Cl_2 + 2NH_3 \rightarrow N_2 + 6HCl$

The series of steps to oxidize the ammonia to nitrogen gas are:

(1) $Cl_2 + H_2O \rightarrow HOCl + HCl$
(2) $NH^+_4 HOCl \rightarrow NH_2Cl + H_2O + H^+$
(6) $2NH_2Cl + HOCl \rightarrow N_2 + 3HCl + H_2O$ The "breakpoint" is defined as the point where the $NH_3$—N is reduced to zero, free available chlorine is detected and the total residual chlorine is minimized. The following undesirable side reactions may also occur.

(3) $NH_2Cl + HOCl \rightarrow NHCl_2 + H_2O$
(4) $NHCl_2 + HOCl \rightarrow NCl_3 + H_2O$
(8) $NH^+_4 + 4Cl_2 + 4H_2O \rightarrow HNO_3 + H_2O = 8HCl + H^+$ To provide successful and economical oxidation of ammonia to nitrogen gas, the reaction conditions are intentionally manipulated to favor Equation 6 and minimize the products of Equations 3, 4, and 8. The successful control of these reactions makes possible the conversion of relatively large amounts of ammonia present in wastewater to harmless nitrogen gas, with minimum formation of undesirable byproducts. Thus, the natural biological nitrogen cycle (ammonia conversion to nitrogen) is simulated chemically and at minimum chlorine dose.

To favor reaction 6 the pH should be controlled to maintain at all times, and at all locations in the reaction vessel, a pH between about 5.8 and 9.5 and preferably in the range of 6 to 8. At pH 6–8 the reaction proceeds fastest with the least quantities of chlorine and base; below pH 5.8 undesirable amounts of $NCl_3$ are produced and there is a high chlorine demand, while at about pH 9.5 other undesirable side reactions occur. However, because of acid production during the chlorine hydrolysis (reaction 1) the pH of the influent may exceed 9.5.

In addition to pH control, the chlorine dosage must be carefully maintained, to minimize $NCl_3$ and chloramine formation, within the range of 8 to 10 parts of chlorine per part of $NH_3$–N for most municipal wastewaters. To maintain the desired ratio of reactants and the desired pH value, at all locations within the reactor zone, it is essential to provide adequate mixing of the introduced chlorine with the wastewater.

When the influent wastewater is raw, untreated wastewater, the ratio of chlorine feed to $NH_4$—N content should normally be about 10:1. When the influent wastewater is highly treated, such as lime clarified and filtered secondary effluent, about 8 parts per weight of chlorine are usually needed per part of $NH_3$—N. Since wastewater may contain from less than 8 to more than 30 mg./l. but will generally lie between 15–20 mg./l. of ammonia, it is seen that the quantity of chlorine necessary to remove the ammonia may lie between 64 and 300 mg./l., but will generally lie between 120 and 200 mg./l. of chlorine, and more normally between 120–170 mg./l. of chlorine.

Such a breakpoint chlorination for the ammonia removal from wastewaters serves to convert most of the influene $NH_3$—N to $N_2$ gas. The effluent from the controlled chlorination reaction will contain a measurable and controllable amount of free chlorine, approximately 1.5 mg./l. chloramines (as N), 1 mg./l. $NO^-_3$, and zero $NH_3$—N. In the optimized controlled system with an chlorine dose of approximately 170 mg./l., the effluent will contain approximately 2–3 mg./l. free chlorine (but may contain, if desired, up to about 8–10 mg./l. of chlorine), 1.5 mg./l. of chloramines (as N) and 1 mg./l. of $NA^-_3$—N. Therefore, total nitrogen remaining in the effluent (organic nitrogen, chloramines, and nitrate) is approximately 3 mg./l. If lower nitrogen residuals are required, the chloramines and nitrates must be removed.

The free chlorine is a very effective disinfectant and also is used to control or limit biological activity. The absence of ammonia (a nutrient) also helps to limit biological activity. When the effluent from breakpoint chlorination is fed to a carbon adsorption zone, the two processes complement one another with respect to maximum nitrogen and carbon removal.

The activated carbon not only adsorbs organic carbon but also chloramines. The free chlorine and chloramines limit the growth of the biological slimes, particularly in the most troublesome area, the first few feet of bed depth. In this section of the carbon column, dechlorination proceeds according to the reaction:

(9) $HOCl \rightarrow H^+ + Cl^- + O^-$

The hydrochloric acid is released into the process effluent and the oxygen is chemisorbed on the carbon. The oxygen is released as CO or $CO_2$ during thermal regeneration. The acid lowers the pH and alkalinity of the wastewater as it passes through the carbon.

The frequency of backwashing the lead carbon column can be reduced considerably with the chlorination/carbon column setup. Because of the minimum slime growth, the carbon loss during backwashing is minimized. Hydrogen sulfide in the carbon effluent is minimized, again indicating reduced biological activity.

A small amount of biological activity does exist, especially near the end of the column series. This activity is sufficient to convert the nitrate produced by breakpoint chlorination to harmless nitrogen gas, thus allowing maximum soluble nitrogen removal.

In the figure there is shown a mode of operation where the chlorine, in continuously controlled amount, is injected into the influent wastewater immediately before such wastewater is fed to a suitable mixer-reactor. Also fed to the mixer is a variable amount of base, determined by the pH of the effluent leaving the reactor. The effluent leaving the mixer-reactor containing on the order of 1.5 mg./liter of chloramine and as much as 2–3 to 8–10 mg./l. of free chlorine is then passed to suitable carbon adsorption columns where reaction (9) occurs to effect oxidation and disinfection of slime.

Slightly different systems than that illustrated, e.g., in which a given proportion of the effluent leaving the mixer-reactor is recycled and wherein the base, the controlled amount of chlorine and the recycle are mixed prior to being injected into the reactor where they are thoroughly mixed with the influent wastewater, may be used. Also two or more stages may be used wherein the influent wastewater is mixed and reacted with a first and partial charge of chlorine in a first mixer-reactor; the product is then passed to a zone for removal of carbon dioxide, and then to a second mixer-reactor where it is mixed with a mixture of chlorine, recycle and base.

In general, the chlorine and sufficient base, such as sodium, potassium or calcium hydroxide—or sodium hypochlorite in lieu of the free chlorine and base—are added separately or together to various wastewaters containing ammonia, such as raw wastewater, primary effluent, secondary effluent, tertiary effluents such as lime clarified and filtered secondary effluent, lime clarified and filtered raw wastewater, selective ion exchange effluent, or regenerant brine from selective ion exchange. Breakpoint chlorination of ammonia concentrations normally encountered in wasetwaters usually produces more acid than can be neutralized by the buffer capacity of the wastewater. Stoichiometrically (Equations 1, 2 and 6) 14.25 mg./l. of $CaCO_3$ alkalinity are required to neutralize the acid produced by the oxidation of one mg./l. $NH_3$—N to $N_2$. If sufficient alkalinity is not present to maintain the pH of the reaction greater than 5.8, base must be added.

The amount of chlorine required for breakpoint depends upon the ammonia and non-ammonia chlorine demand in the wastewater. In general, as the degree of wastewater treatment before the breakpoint process increases, the amount of non-ammonia chlorine demand decreases and the chlorine requirement approaches the theoretical 7.6:1 weight ratio of Cl to $NH_3$—N of Equation 7. For example: a 10:1 $Cl:NH_3$—N weight ratio was required in tests to breakpoint raw wastewater, and approximately an 8:1 ratio was needed for lime clarified and filtered secondary effluent. The amount of chlorine feed in turn, depends upon the total breakpoint demand plus the amount of residual free chlorine desired for the adsorption columns.

The inlet ammonia concentration and wastewater flow will vary with time. The chlorine dosage must be set and controlled in proportion to the ammonia feed. With two low a chlorine dosage, the reaction will not go to completion and chloramines will be the end product. Nitrogen trichloride will be formed if too great an excess chlorine (beyond that needed for breakpoint plus as much as 8–10 mg./l.) is added to the system. However, if some nitrogen trichloride is formed, the carbon adsorption will remove that nitrogen trichloride from the water.

Good homogeneous mixing must be available at the chlorine application point especially in the pH range 6–8 where the reaction is nearly instantaneous. Incomplete mixing will cause local high concentrations of chlorine and low pH, causing nitrogen trichloride production. The mixing can be accomplished in line or, if necessary, in an agitated reactor. Reaction at low pH, requiring excess chlorine feed and producing noxious $NCl_3$, must be avoided.

The temperature of the wastewater, in the range of interest (40°–100° F.) does not significantly affect the product distribution or the required chlorine dosage.

The invention will be better understood for consideration of the following working example, which is offered illustratively:

In a pilot plant operation, there was used as a chlorination reactor, a 1200 gal. vessel, 4 ft. in diameter and 12 ft. tall. The vessel was an existing pH control tank which was larger than needed for chlorination and only a portion of its volume was used. The reaction volume was the bottom three feet of the vessel (310 gal.) which was divided into three equal sections, separated by epoxy-coated plywood inserts. In each section, a propeller mixer mounted on a common shaft, driven by a three H.P. motor, was rotated at 224 r.p.m. Carbon columns were placed downstream of the chlorinator.

A pump on the effluent stream recycled 11 gal./min. into the first mixing stage. Chlorine was added to the recirculation loop through a Wallace & Tiernan chlorinator and injector nozzle. The dose rate was manually set to provide a dosage equal to an 8.5–9.0:1 Cl:N weight ratio. The pH of the water in the reactor was maintained automatically by pumping a 1–2% NaOH solution into the line ahead of the chlorine injector. The NaOH feed was controlled by an inline pH probe on the discharge effluent. The chlorinated effluent was then pumped downstream to carbon columns.

A Technicon Auto-Analyzer monitored the $NH_3$—N concentration of the feed and effluent. The free chlorine in the effluent was titrated manually.

In the study, the average analysis of the feed (filtered secondary effluent) for BOD, COD, TAC, and suspended solids was 16 mg./l., 41 mg./l., 18 mg./l. and 25 mg./l., respectively. The pH of the feed ranged from 7.0 to 7.3 with an alkalinity of 120–150 mg./l. as $CaCO_3$. During all the runs, the water temperature was 58° C. The flow rates ranged from 25 to 35 gal./min. with a residence time in the reaction zone from 6.8 to 8.6 minutes.

During construction of the systems described above, chlorination was also attempted on an effluent leaving an ion exchanger in the plant using an eductor to mix chlorine water and wastewater in a 2-inch pipe. The $NH_3$—N ranged from 3.0 to 8.0 mg./l. and the flow rate was 20 gal./min. Samples were taken six feet downstream of the eductor. The ion exchange effluent was also chlorinated in the laboratory with the pilot plant's chlorine water.

Chlorination of the ion exchange effluent in the eductor mixing system did not achieve breakpoint and excessive $NCl_3$ formation occurred. The pH decreased from 7.3 to 6.5. A comparative test in the laboratory with good mixing achieved breakpoint between the 8:1 and 9:1 Cl:N weight ratio. The pH decreased from 7.6 before chlorination to 6.1 at the breakpoint. Another plant test with the pH controlled at 7.0 by caustic addition still did not achieve breakpoint. Thus, the eductor did not provide adequate mixing thereby highlighting the importance of adequate mixing.

Chlorination of filtered secondary effluent in the chlorination reactor achieved breakpoint in the pH range 6.0 to 8.0. Typical breakpoint data at pH 7.0–7.5 revealed the relation between $NH_3$—N, free chlorine, and total residual chlorine. Breakpoint occurred at a chlorine dosage between the 8–9:1 Cl:N weight ratio.

In repeated tests, (Table 1) the influent $NH_3$—N concentrations, ranging from 12.9 to 21.0 mg./l., were reduced to less than 0.1 mg./l. $NH_3$—N with chlorine dosages from 8.4 to 9.2:1 Cl:N weight ratio. The amount of free chlorine residual increased with increasing overdoses of chlorine.

TABLE 1.—BREAKPOINT CHLORINATION OF FILTERED SECONDARY EFFLUENT

| $NH_3$—N, mg./l. | | | | |
|---|---|---|---|---|
| Influent | Effluent | pH | Cl:N wt. ratio | Free Cl⁻, mg./l. |
| 15.4 | <0.1 | 8.0 | 8.4:1 | 2.4 |
| 12.9 | <0.1 | 7.0 | 9.0:1 | 3.0 |
| 13.9 | <0.1 | 6.0 | 8.4:1 | 7.0 |
| 21.02 | <0.1 | 7.0 | 8.5:1 | 2.5 |
| 17.0 | <0.1 | 7.5 | 8.2:1 | 8.5 |
| 20.3 | <0.1 | 6.0 | 8.8:1 | 6. |

Caustic requirements in the pH range 6.0 to 7.9 increased with increasing chlorine dose. Based on Equation 1, the stoichiometric NaOH requirement for maintaining an influent pH was 1.13 pounds NaOH per pound of chlorine added. Calcium hydroxide solution was also used. One run at pH 7.0 indicated approximately 1.0 pound CaO required per pound of $Cl_2$.

The formation of nitrate was minimized by operating in the lower pH range. In contrast, the formation of nitrogen trichloride decreased with increasing pH. More importantly, $NCl_3$ concentration increased sharply for chlorine dosage above the breakpoint. Thus, good mixing, pH control, and chlorine dosage control was required to minimize undesirable by-products.

Because $NCl_3$ formation is more dependent on chlorine dosage, rather than pH, operation at pH between 6 and 7, with good chlorine dosage control, would minimize both $NO^-_3$ and $NCl_3$. If good chlorine dosage control is not achieved, operation at pH 8 would minimize the noxious $NCl_3$ formation, giving a slightly increased $NO_3$—N residual.

During these tests, the carbon columns removed all the free residual chlorine passing from the chlorinator. The buildup of slime, normally a problem in carbon adsorption, was inhibited by the combined effect of prior ammonia removal and slimicidal activity of the residual chlorine in the carbon columns.

It will be obvious to those skilled in the art that various changes may be made without departing from the scope of the invention and the invention is not to be considered limited to what is described in the specification.

What is claimed is:

1. A method for the purification of wastewater comprising
   feeding a stream of wastewater having an $NH_3$—N content in the range of about 8–30 mg./liter of wastewater to a mixer-reactor;
   feeding a stream of chlorine to said mixer-reactor in an amount of about 65–300 mg. of chlorine per liter of wastewater to provide a Cl:$NH_3$—N ratio of about 8–10:1;
   thoroughly mixing said streams in said mixer-reactor immediately upon entrance of said streams thereto;
   maintaining the pH throughout said mixer-reactor at a value of greater than 5.8 and less than about 9.5, and thereby providing uniform breakpoint chlorination;
   feeding the effluent, substantially free of $NH_3$—N and containing free residual chlorine and chloramines, from said mixer-reactor to a carbon adsorption zone, and adsorbing within said carbon adsorption zone said free chlorine and chloramines and carbon impurities within said effluent.

2. A method in accordance with claim 1 comprising controlling said feed of chlorine to provide a chlorine residual of about 2–8 mg./liter.

3. A method in accordance with claim 2 wherein said wastewater is raw or primary wastewater and said ratio of Cl:$NH_3$—N is maintained at about 10:1.

4. A method in accordance with claim 2 wherein said wastewater is secondary or tertiary effluent or chemically clarified raw wastewater and said ratio of Cl:$NH_3$—N is maintained at about 8:1.

5. A method in accordance with claim 2 wherein said chlorine is fed at a rate of about 120–170 mg./liter.

6. A method in accordance with claim 5 wherein said pH is maintained at about 6–8.

7. A method in accordance with claim 1 comprising feeding base to said mixer-reactor to maintain said pH at 5.8 to 9.5.

References Cited
UNITED STATES PATENTS

| 1,771,518 | 7/1930 | Adler et al. | 210—61 |
| 1,973,168 | 9/1934 | Henderson et al. | 210—62 |
| 1,989,380 | 1/1935 | Romans | 210—62 |
| 2,112,476 | 3/1938 | Bowers et al. | 210—28 |
| 2,238,896 | 4/1941 | Gibbons | 210—62 |
| 2,443,429 | 6/1948 | Marks et al. | 210—62 |
| 2,661,333 | 12/1953 | Schein | 210—61 |
| 3,635,817 | 1/1972 | Zuckerman et al. | 210—40 X |

OTHER REFERENCES

Van Kleek, L.W., "The Functions of Sewage Chlorination," Wastes Engineering, June 1956.

SAMIH N. ZAHARNA, Primary Examiner

T. G. WYSE, Assistant Examiner

U.S. Cl. X.R.

210—29, 40, 62